United States Patent [19]

Carbon

[11] 4,075,940
[45] Feb. 28, 1978

[54] BAKER FOR WAFFLES, PANCAKES AND SIMILAR FOOD ITEMS

[76] Inventor: Fred S. Carbon, 105 Days Ave., Buchanan, Mich. 49107

[21] Appl. No.: 764,766

[22] Filed: Feb. 1, 1977

[51] Int. Cl.² .......................................... A47J 37/00
[52] U.S. Cl. ...................................... 99/377; 219/524
[58] Field of Search ............ D7/87, 88, 89; 219/524, 219/525; 99/372, 377, 380, 378, 374, 375, 376, 379

[56] References Cited

U.S. PATENT DOCUMENTS

| D. 87,896 | 10/1932 | Wagner | D7/88 |
|---|---|---|---|
| 229,280 | 6/1880 | Selden | 99/377 |
| 270,659 | 1/1883 | Griswold | 99/377 |
| 1,609,317 | 12/1926 | Smith | 99/377 |
| 1,708,499 | 4/1929 | Filbey | 99/377 |
| 1,879,010 | 9/1932 | Antrim | 99/377 |
| 1,954,235 | 4/1934 | Becker | 99/378 X |
| 2,116,688 | 5/1938 | Ratliff | 99/377 |

*Primary Examiner*—Billy J. Wilhite
*Attorney, Agent, or Firm*—Oltsch & Knoblock

[57] ABSTRACT

A baker for waffles, pancakes and similar food items which includes a pair of hinged shell members in which the food item is baked. The shell members are supported upon a base and each includes an electrical heating element. The hinge connection between the shell members accommodates the wiring for the heating elements. Such wiring extends through a shaft member to an electrical power source, with the shaft member accommodating rotation of the shell members as a unit relative to the base.

11 Claims, 8 Drawing Figures

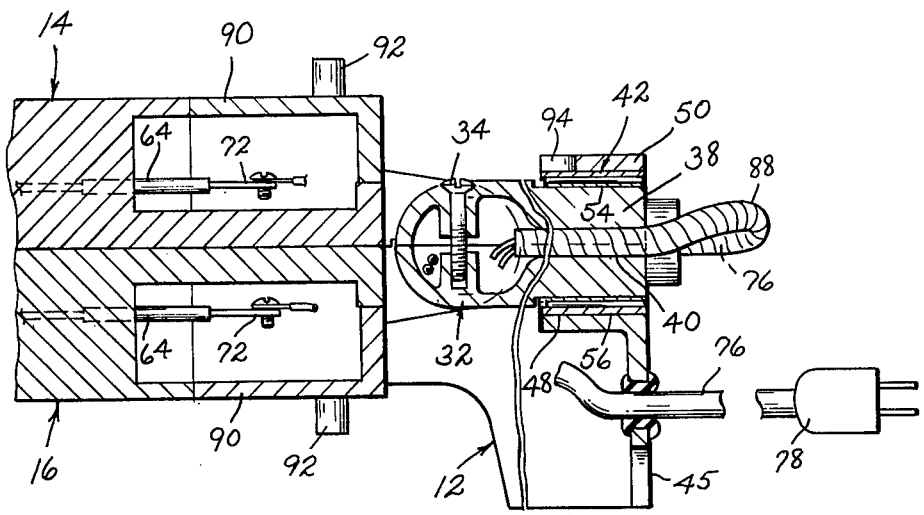
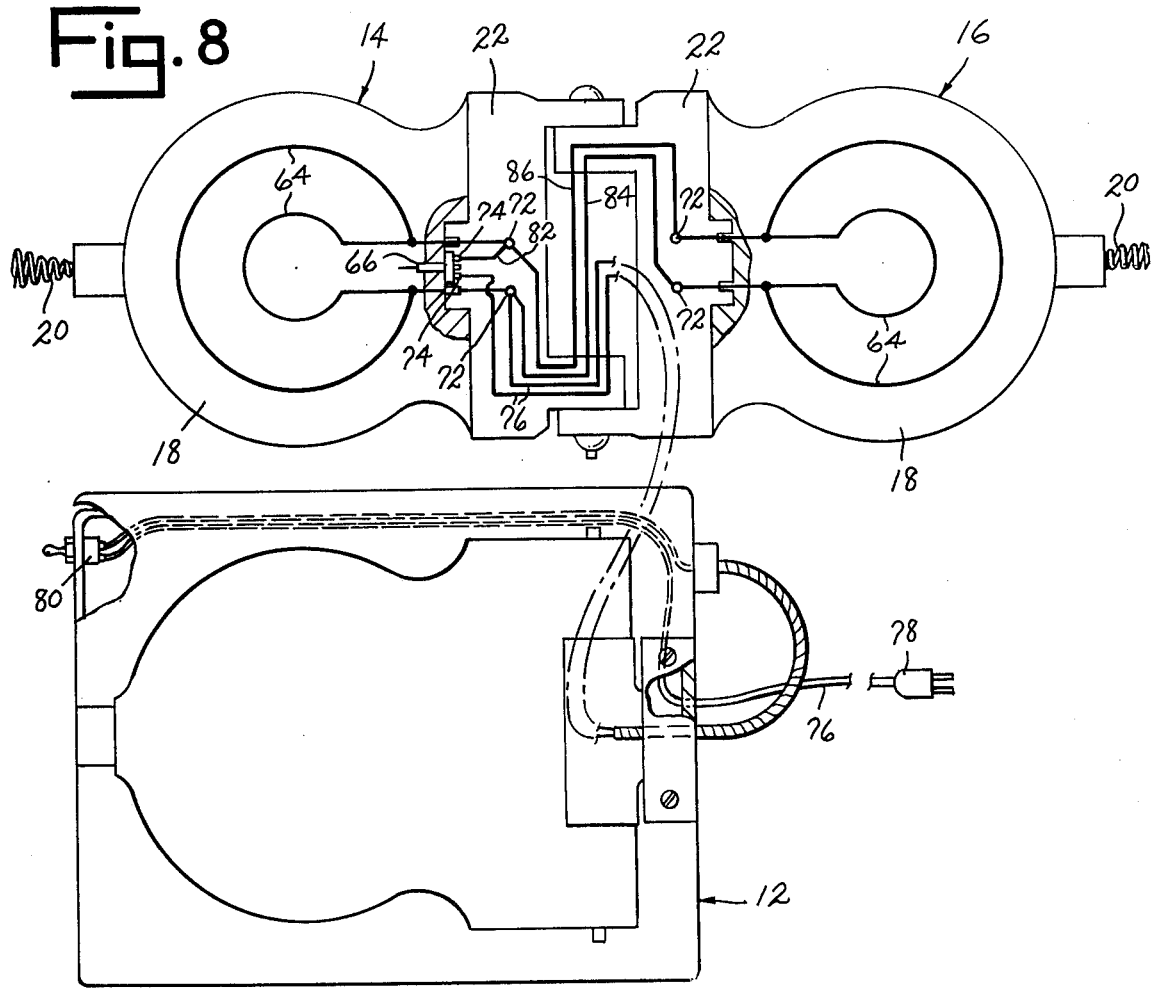

BAKER FOR WAFFLES, PANCAKES AND SIMILAR FOOD ITEMS

SUMMARY OF THE INVENTION

This invention relates to a baker which is used for the baking of waffles, pancakes and similar food items, and which incorporates an improved electrical wiring system by which the shell elements of the baker are heated.

In the baker of this invention is a pair of shell members which carry electrical heating elements and which are designed to receive the food item in uncooked form. The shell members are hinged together for pivoted separation. A base supports the shell members in such a manner as to permit the shell members to be rotated as a unit relative to the base. The inventive improvement relates to the manner in which the two shell members are hinged together to accommodate electrical wiring which connects the heating elements of the shell members to an electrical power source. Through the design of the hinge connection between shell members the electrical wiring to the heating elements is protected from contact with batter or grease, and from being detrimentally twisted during usage of the baker.

Accordingly, it is an object of this invention to provide a baker which is for waffles, pancakes and similar food items and which is of reliable construction and simplified operation.

Another object of this invention is to provide a waffle and pancake baker which can be simply maintained.

Still another object of this invention is to provide a baker which is for waffles, pancakes and similar food items and which includes a pair of pivotal shell members having heating elements for cooking and incorporating a unique wiring system for the heating elements.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 7 is a fragmentary sectional view taken along line 7—7 of FIG. 5.

FIG. 8 is a diagrammatical view of the baker illustrating the wiring system thereof.

DESCRIPTION OF THE PREFERRED EMBODIMENT

Figure 1:
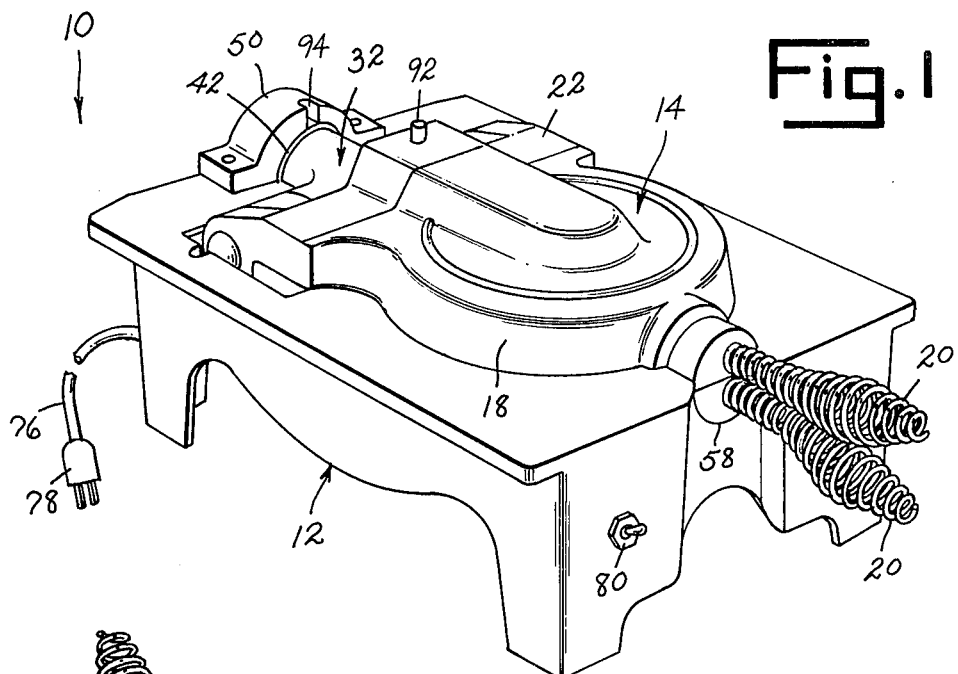
FIG. 1 is a perspective view of the baker showing the shell members thereof in their closed position.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Baker 10 includes a base 12 and a pair of shell members 14 and 16. Each shell member 14 and 16 includes a concave food receiving part 18, a handle 20 and a hinge part 22. If baker 10 is to be utilized for the cooking of waffles, each food receiving part 18 of shell members 14 and 16 will be sectioned as shown in the drawings.

The hinge part 22 of each shell member 14 and 16 includes a pintel 24 and a spaced coaxial eyelet 26. Each pintle 24 includes a head portion 28 and a tail portion 30. Shell members 14 and 16 are joined together for pivotal movement by having head portion 28 of shell member 14 inserted into eyelet 26 of shell member 16 and head portion 28 of shell member 16 inserted into eyelet 26 of shell member 14. With shell members 14 and 16 so connected together at their respective hinge parts 22, one shell member can be pivoted relative to the other shell member about an axis 23 through interconnected pintels 24 and eyelets 26 between the closed position shown in FIG. 1 and the open position shown in FIG. 2.

Figure 6:
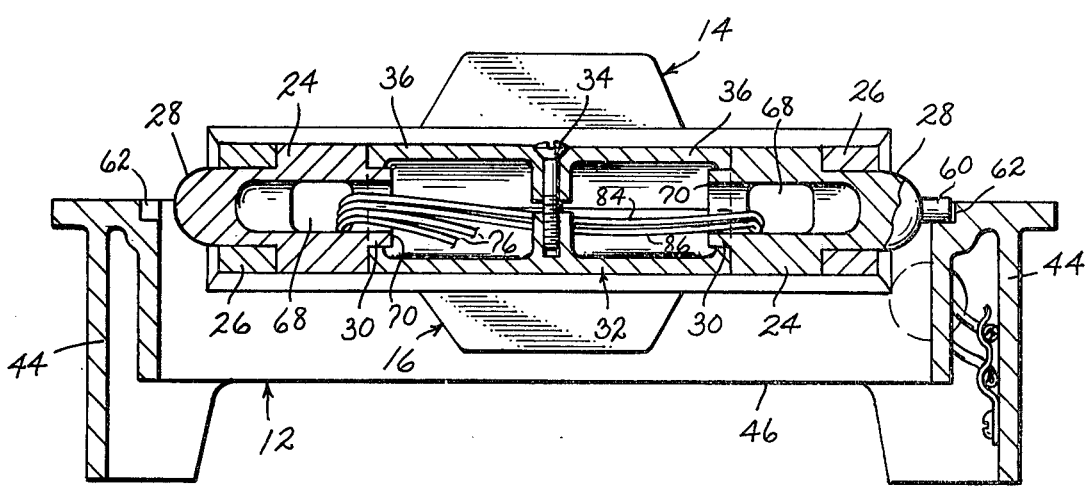
FIG. 6 is a cross sectional view of the baker taken along line 6—6 of FIG. 5.

A T-shaped bracket 32 having arms 36 and a leg 38 is connected to shell members 14 and 16 at their respective hinge parts 22. Bracket 32 is preferably of a two part symmetrical construction to facilitate assembly. A screw 34 secures the halves of bracket 32 together about tail portions 30 of hinge parts 22 with arms 36 of the bracket journaling the aligned tail portions, as best illustrated in FIG. 6. In this manner, each shell member 14 and 16 individually or both shell members may pivot at their hinge parts 22 relative to bracket 32.

Figure 2:
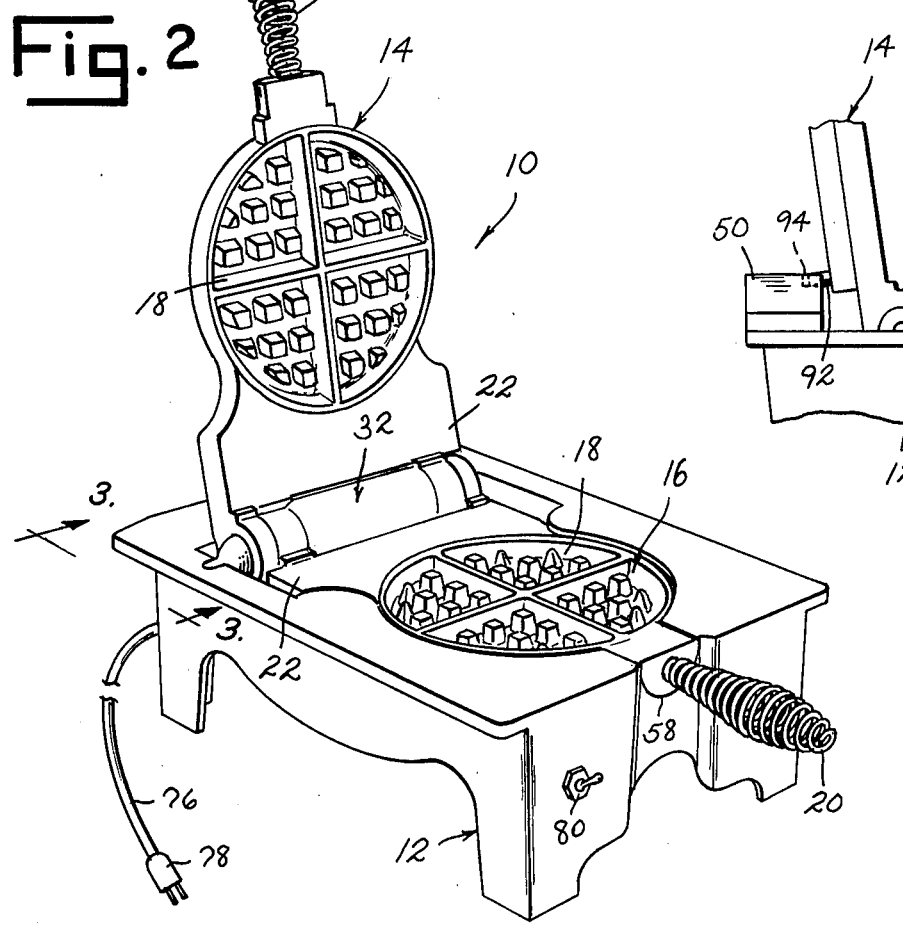
FIG. 2 is a perspective view of the baker showing the shell members in an open position.
Figure 3:
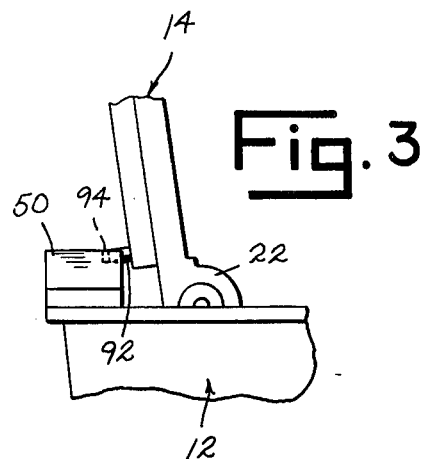
FIG. 3 is a fragmentary side view of the baker as seen from line 3—3 of FIG. 2.
Figure 4:
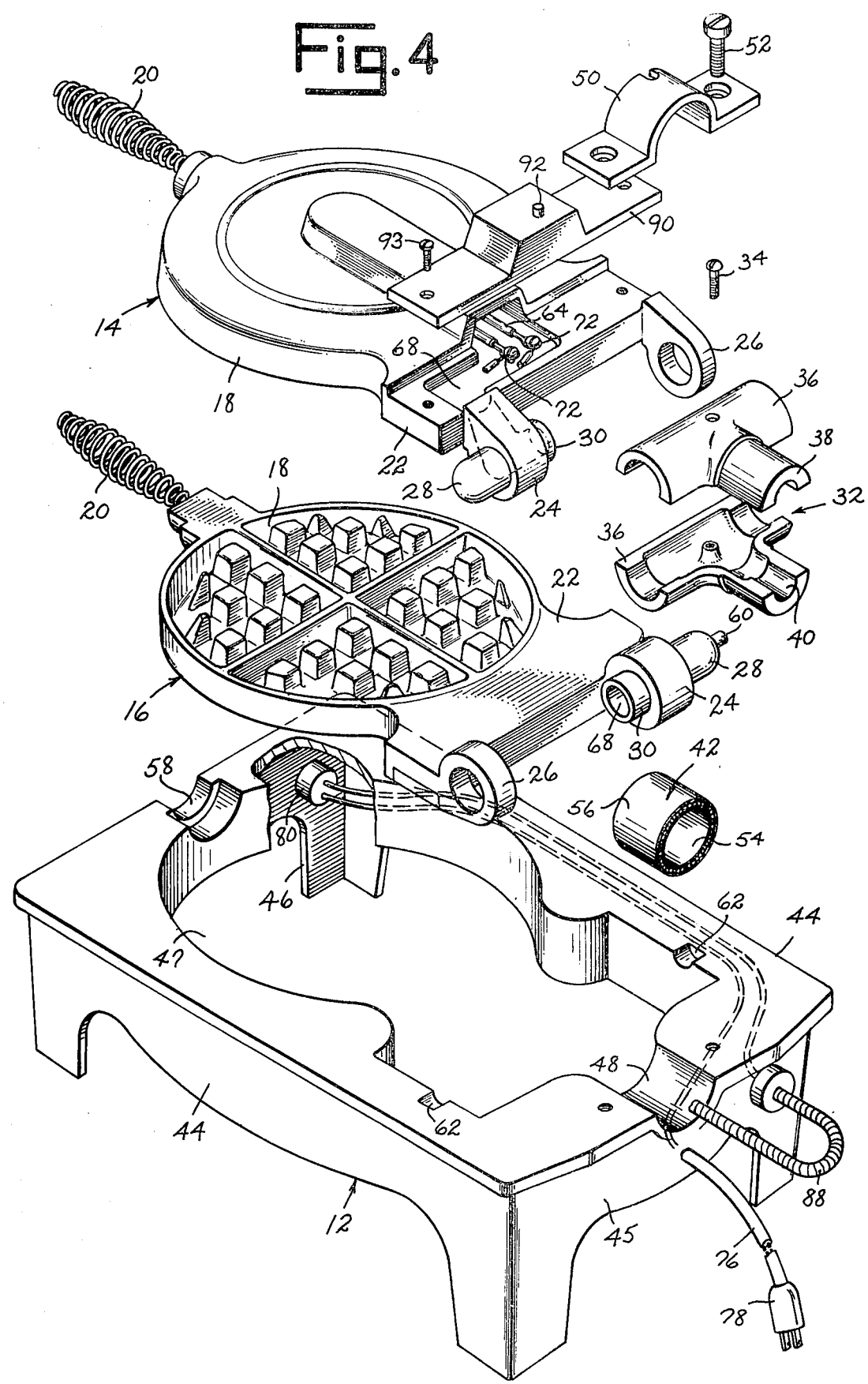
FIG. 4 is a perspective view of the baker showing the component parts thereof in separated form.
Figure 5:
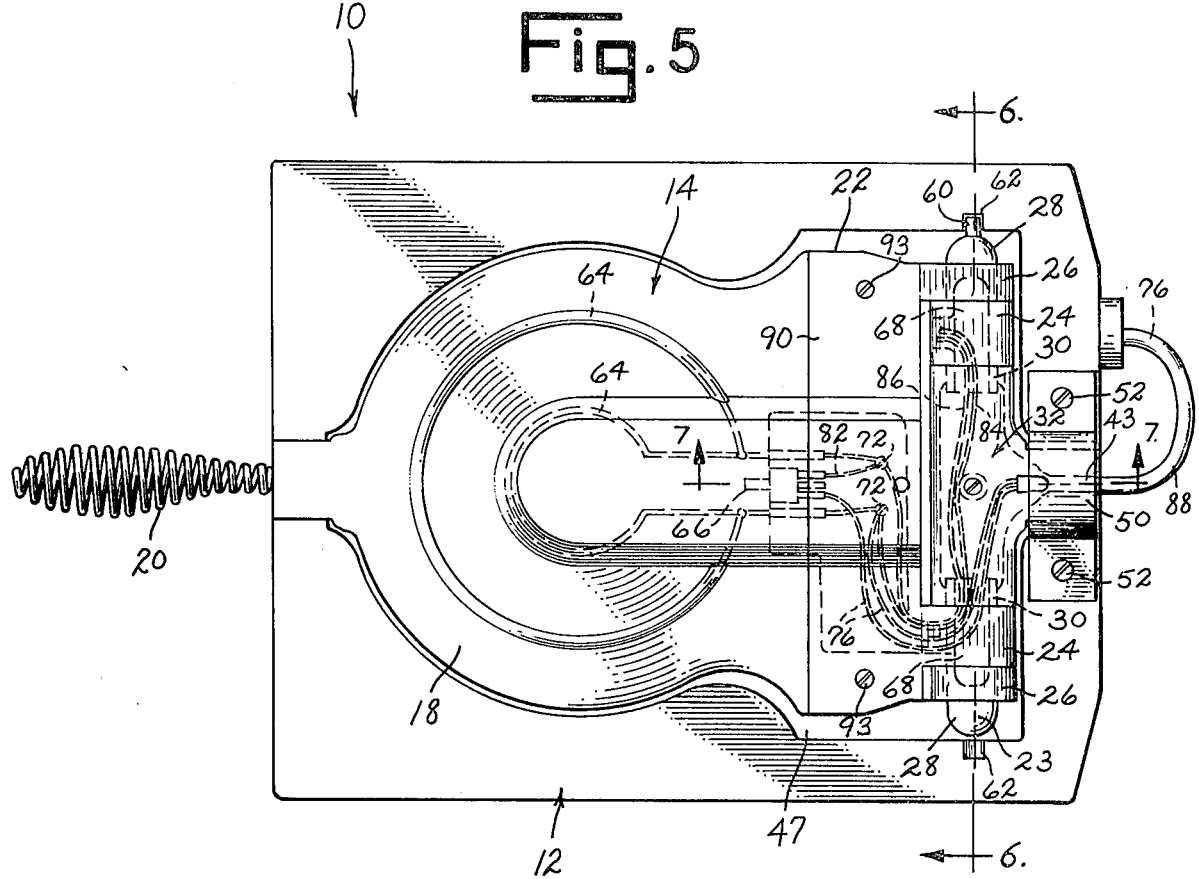
FIG. 5 is a top plan view of the baker with the shell members in their closed position.

Leg 38 of bracket 32 is provided with a center bore 40 which extends into the hollow interior of the bracket. A bearing 42, which is preferably of the roller type, is fitted about bracket leg 38. Base 12 of baker 10 includes side walls 44 and end walls 45 and 46 and is of a frame shape having an upper opening 47 which approximates the outline of food receiving parts 18 and hinge parts 22 of shell members 14 and 16. End wall 45 of base 12 is provided with a groove 48 at its upper edge. Bearing 42 is supported within base groove 48 and is secured to the base by an overlying clamp part 50. Clamp part 50 is secured to underlying end wall 45 by screws 52. The inner race 54 of bearing 42 is press fitted over leg 38 of bracket 32 and outer race 56 of the bearing is securely clamped within base groove 48 by clamp part 50 to allow bracket 32 to rotate relative to base 12 while preventing the bracket from being disconnected from the base during usage of the baker. In other embodiments of this invention, bearing 42 may be secured to base 12 by keying, lock rings or other similar locking means. End wall 46 of base 12 is provided with a groove 58 at its upper edge. Groove 58 is in general longitudinal alignment with groove 48 and is positioned to support one or both shell members 14 and 16 near handles 20 of the shell members when the shell members are closed and horizontally positioned, as shown in FIG. 1, or when the shell members are in their open position, as shown in FIG. 2. In this manner, shell members 14 and 16 are supported by base 12 for rotation within center opening 47 of base 12 about a generally horizontal axis through grooves 48 and 58.

Pintel 24 of shell member 16 includes a protruding pin 60 which makes contact with the upper edge of each base side wall 44 as the closed shell members are pivoted when in their horizontal base supported position, as shown in FIG. 1. Pin 60 serves as a stop which limits the rotative movement of closed shell members 14 and 16 to 180°, and thus prevents undue twisting of the electrical wiring which extends into the shell members.

Each base side wall 44 may be provided with a recess 62 to accommodate pin 60 and to assure that the shell members will be stopped in their extreme rotative positions with food receiving parts 18 of the shell members in a generally horizontal plane. Through utilization of shell member hinged parts 22 and bracket 32 shell members 14 and 16 are pivotal individually or together relative to base 12 about a pivot axis 23 defined generally by hinge part pintels 24. Additionally, shell members 14 and 16 are also pivotal together about a pivot axis 43 through bearing 42 and extending transversely to the shell member pivot axis 23 defined by pintels 24.

Each food receiving part 18 of shell members 14 and 16 includes one or more embedded heating coils 64. A thermostat 66 for controlling the heat output of coils 64 is carried by food receiving part 18 of shell member 14. Each hinge part 22 includes a passage 68 which extends from end face 70 of the pintel tail portion 30 through the body of the pintel and into the interior of the hinge part to where contacts 72 of heating coils 64 and, in the case of shell member 14, contacts 74 of thermostat 66 are located. An electrical power cord 76 extends through base 12 and includes a suitable plug 78 by which the cord can be connected into an electrical outlet. Cord 76 passes through a switch 80 which is located at the front of base 12 of the baker 10 and which serves to turn the electrical power to heating coils 64 in shell members 14 and 16 on and off. Power cord 76 extends through bore 40 in leg 38 of bracket 32 and into passage 68 in pintel 24 of shell member 14. The positive and negative leads of cord 76 are connected to one of the contacts 72 of heating coil 64 and one of the contacts 74 of thermostat 66 in shell member 14. A wire 82 extends between the other heating coil contact 72 and the other thermostat contact 74 of shell member 14.

Wires 84 and 86 connect heating coils 64 of the shell members 14 and 16 in parallel, with wire 84 being connected to a heating coil contact 72 of shell member 14 and a heating coil contact 72 of shell member 16, and with wire 86 being connected to the other heating coil contact 72 of shell member 14 and the remaining heating coil contact 72 of shell member 16. Wires 84 and 86 extend through passage 68 in hinge part 22 of shell member 14 and through passage 68 in hinge part 22 of shell member 16. Power cord 76 and its leads as well as wires 82, 84 and 86 are suitably insulated. By having power cord 76 and heater coil wiring 82, 84 and 86 extend through passages 68 in hinge parts 22, one shell member 14, 16 can be pivoted about its hinge part relative to the other shell member without undue twisting or manipulation of the power cord or wiring. Additionally, all wiring within shell members 14 and 16 is enclosed and not exposed where grease, flour, dough or other food items or dirt can accumulate on it. Bearing 42 eases the effort which is required to rotate shell members 14 and 16 in their closed position.

A flexible metal sheath 88 may be provided about power cord 76 where it protrudes from bore 40 in bracket 32 and into base end wall 45. Upon rotation of bracket 32 within the 180° turning radius permitted by pin 60 of shell member 14, power cord 76 will experience only limited non-detrimental twisting movement. This twisting movement will occur either within the interior of bracket 32 or along the exposed exterior portion of the power cord which is covered by sheath 88, depending upon the fit of the sheath and power cord within bracket bore 40.

Each hinge part 72 of shell members 14 and 16 includes a cover plate 90 which is attached to the remainder of the hinge part by screws 93. Each cover plate 90 can be removed to expose a portion of groove 68 in the hinge part for purposes of ease of assembly and repair if necessary. A pin 92 is carried by each cover plate 90 to support the shell member in its open position, such as illustrated in FIG. 2. Clamp part 50 is provided with a receiving notch 94 to accommodate pin 92. With pin 92 of either shell member 14 or 16 received within notch 94 of clamp part 50, the opened shell members 14 and 16 will be prevented from rotating while the batter or food item is being added to the food receiving part 18 of the lower shell member.

Shell members 14 and 16 of baker 10 are preferably formed of a heat conductive metallic composition, such as cast aluminum or iron. Base 12 of the baker may also be formed of cast aluminum or iron or of other materials which are able to withstand deformation due to the heat of shell members 14 and 16 during usage of the baker.

It is to be understood that the invention is not to be limited to the details above given but may be modified within the scope of the appended claims.

What I claim is:

1. A baker for waffles, pancakes and similar food items, said baker including first and second shell members each having a hinge part and a concave food receiving part, said shell members having their respective hinge parts in a cooperating relationship and being pivotal about a first axis between a closed position in which said food receiving parts confront one another to form an enclosed baking cavity and an open position in which the shell members are separated at the food receiving parts thereof, heating element means in each shell member at the food receiving part thereof, a base, said base including means for supporting said shell members for rotation as a unit about a second axis when in their closed position, at least one of said shell members including handle means for rotating said shell members in their closed position about said second axis, the improvement wherein each shell member hinge part includes a pintel and a spaced eye, the hinge part pintel of each shell member fitting rotatively into the hinge part eye of the other shell member to accommodate movement of the shell members between their open and closed positions, each shell member including passage means extending through its said pintel to the heating element means therein for receiving wiring means, and bracket means engaging said hinge parts for supporting said shell members and accommodating pivotal movement of the shell members between said open and closed positions, said bracket means including a shaft part, said base carrying said shaft part at its said shell member supporting means, said shaft part being rotatable with the shell members as the shell members are rotated about said second axis of rotation, said wiring means for conducting an electrical current from a power source to each heating element means and extending through said shaft part and each passage means to each heating element means.

2. The baker of claim 1 wherein each hinge part pintel includes a head portion and a tail portion with said tail portion thereof having said passage means therein, said pintel head portion of each shell member fitting rotatably within the hinge part eye of the other shell member with the pintel tail portions of the shell members being in a spaced opposing relationship, said bracket means extending about said opposing pintel tail portions and including bearing surface means contacting the pintel tail portions for accommodating rotative movement of the pintel tail portions within said bracket means.

3. The baker of claim 1 wherein said bracket means is for accommodating the pivotal movement of said shell members when in their closed position about said first axis of rotation.

4. The baker of claim 3 and including stop means carried by at least one of said shell members and engageable with said base for limiting pivotal movement of the shell members about said second axis of rotation.

5. The baker of claim 4 wherein said stop means is carried by the hinge part of at least one shell member.

6. The baker of claim 5 wherein said stop means is carried by the hinge part pintel of one said shell member.

7. The baker of claim 3 wherein each shell member carries an abutment means engageable with said base for supporting a selected one of said shell members in a tilted position when said shell members are in their open position to expose said baking cavity.

8. The baker of claim 7 wherein said base includes engagement means for receiving the abutment means of said selected tilted shell member to secure said shell members against rotation when in their open position about said second axis of rotation.

9. A baker for waffles, pancakes and similar food items, said baker including first and second shell members each having a hinge part and a concave food receiving part, said shell members having their respective hinge parts in a cooperating relationship and being pivotal about a first axis between a closed position in which said food receiving parts confront one another to form an enclosed baking cavity and an open position in which the shell members are separated at the food receiving parts thereof, a base, said base including means for supporting said shell members for rotation as a unit about a second axis when in their closed position, at least one of said shell members including handle means for rotating said shell members in their closed position about said second axis, the improvement wherein each shell member hinge part includes a pintle and a spaced eye, the hinge part pintel of each shell member fitting rotatively into the hinge part eye of the other shell member to accommodate movement of the shell members between their open and closed positions, and bracket means engaging said hinge parts for supporting said shell members and accommodating pivotal movement of the shell members between said open and closed positions, said bracket means including a shaft part, said base carrying said shaft part at its said shell member supporting means, said shaft part being rotatable with the shell members as the shell members are rotated about said second axis of rotation.

10. The baker of claim 9 wherein each hinge part pintel includes a head portion and a tail portion, said pintel head portion of each shell member fitting rotatably within the hinge part eye of the other shell member with the pintel tail portions of the shell members being in a spaced opposing relationship, said bracket means extending about said opposing pintel tail portions and including bearing surface means contacting the pintel tail portions for accommodating rotative movement of the pintel tail portions within said bracket means.

11. The baker of claim 10 wherein said bracket means is for accommodating the pivotal movement of said shell members when in their closed position about said first axis of rotation.

* * * * *